United States Patent [19]

Lerat

[11] Patent Number: 4,840,445

[45] Date of Patent: Jun. 20, 1989

[54] SYSTEM FOR LOCATING AN OBJECT IN SPACE

[75] Inventor: Bernard Lerat, Thones, France

[73] Assignee: Commisariat A L'Energie Atomique, Paris, France

[21] Appl. No.: 204,674

[22] Filed: Jun. 9, 1988

[30] Foreign Application Priority Data

Jun. 10, 1987 [FR] France ................................ 87 08060

[51] Int. Cl.⁴ ............................................. G02B 26/10
[52] U.S. Cl. ..................................... 350/6.8; 350/6.6;
350/6.91; 250/236; 356/154
[58] Field of Search ................... 350/6.1, 6.5, 6.6, 6.7,
350/6.8, 6.9, 6.2, 6.3, 6.91, 171, 6.4; 356/139,
142, 147, 151, 154; 250/236, 234, 557, 561, 573,
574, 235

[56] References Cited

U.S. PATENT DOCUMENTS 3,928,759 12/1975 Sansone ................................. 350/6.8
4,099,830 7/1978 Whittle et al. ...................... 350/6.8
4,314,154 2/1982 Minoura et al. ..................... 350/6.7

FOREIGN PATENT DOCUMENTS 0052524 5/1982 European Pat. Off. .
1756902 12/1970 Fed. Rep. of Germany .
2208559 8/1973 Fed. Rep. of Germany .
3311349 10/1984 Fed. Rep. of Germany .
2516662 5/1983 France .
2085580 4/1982 United Kingdom .

Primary Examiner—John K. Corbin
Assistant Examiner—Loha Ben
Attorney, Agent, or Firm—Nutter, McClennen & Fish

[57] ABSTRACT

A system for locating an object in latitude and longitude is disclosed. A rotating and oscillating mirror makes a laser beam deflect. A sensor fixed to the object indicates the locating instant. A screen that scatters and/or reflects towards a second sensor, on which are stretched reflecting and/or scattering cords, provides latitudinal and longitudinal position-identification of the deflection of the beam. The invention can be applied to robotics.

9 Claims, 3 Drawing Sheets

SYSTEM FOR LOCATING AN OBJECT IN SPACE

BACKGROUND OF THE INVENTION

1. Field of the Invention

The present invention relates to a system for locating an object in space through its latitude and its longitude with respect to a reference.

2. Description of the Prior Art

There is a known means of locating an object, carrying a light source, by means of a camera. The resolution of a locating system of this type is related to that of the camera, namely to the number of pixels that this camera can record. Furthermore, this definition can be adversely affected by the fact that several pixels of the camera are excited simultaneously, in which case, it is necessary to seek the barycenter of several pixels. If it is desired to locate an object in a field with a 10-meter span, it would appear that it is impossible, with this method, to obtain a resolution of higher than one centimeter, and this is inadequate for certain applications.

There are also known methods for locating objects, such as joints between parts to be welded, with a view to their robotized welding. These methods consist in scanning the parts with a laser beam and in focusing the light spot created by impact on a position sensor of the PIN diode type. The locating signals are obtained from the distribution of loads among several electrodes. In addition to the fact that this system is limited to the location of a plane section of the object, it also has insufficient definition for a field such as the one mentioned above.

The present invention seeks to remove these drawbacks.

SUMMARY OF THE INVENTION

The locating system according to the invention has a light beam emitting means, a device for the deflection of the emitted light beam as a function of time, making it perform latitudinal or longitudinal scans of a space in which the object is located, a device to monitor and measure this deflection, a sensor which is fixed to the object and is sensitive to the light beam, as well as a means to determine the direction of the light beam at the instant when said light beam sensitisizes the sensor.

The search for the position of an object in space thus makes it necessary to place a localized position-finding means on this object and to scan the space until this position-finding means, which emits a signal when it is located, is found. If precise location detection is desired, sufficiently fine scanning stages should be provided. It then becomes necessary to choose a high scanning frequency, thus creating problems in the measurement of position, in longitude and latitude, of the direction of the scanning beam. The consequence of this is further uncertainty in locating an object, and this, therefore, hinders the goal that was set.

The present invention provides a solution to this problem and enables the very precise latitudinal and longitudinal location detection of an object moving in space, without requiring an unacceptable scanning time.

For this purpose, and according to the major feature of the invention, the deflection monitoring and measuring device comprises a screen, interposed after the deflection device, which has a surface capable of sending back at least one part of the scattered and/or reflected beam towards a second sensor which is sensitive to the light beam so as to deduce therefrom the deflection references of the beam in latitude and longitude. According to a preferred embodiment of this screen, it comprises a scattering and/or reflecting border which the light beam reaches when it makes extreme latitudinal deflections, and cords that reflect towards the second sensor and are evenly distributed, and for which the coordinates expressed in latitude and longitude are governed by a linear equation.

According to one embodiment of the invention, a high frequency scan along one direction, herein called the latitude, is provided by reflection of the incident light beam on a rotating mirror having the shape of a cylinder with a regular polygon as its base, the lateral surface of which consists of reflecting facets that rotate on a longitudinal axis of symmetry. A device, which makes the cylinder oscillate on a second axis which is substantially colinear with the light beam between the laser and the mirror, provides longitudinal scanning at lower frequency.

BRIEF DESCRIPTION OF THE DRAWINGS

The present invention shall now be described in greater detail with reference to the following figures, which are given as examples and in no way restrict the scope of the invention. Of these figures.

DESCRIPTION OF A PREFERRED EMBODIMENT

Figure 1:
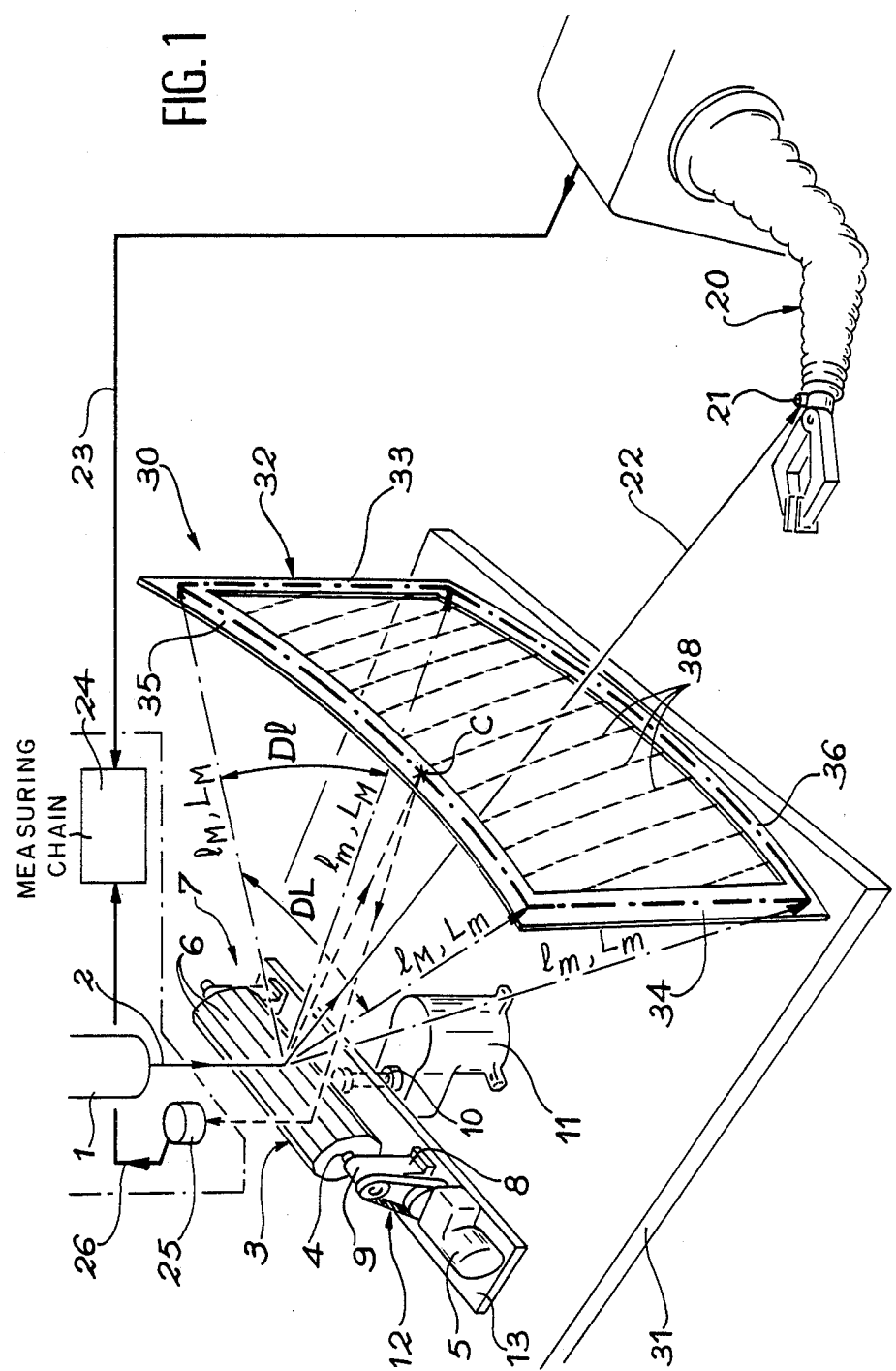
FIG. 1 shows a general view of the invention.

The locating system, shown generally in FIG. 1, comprises firstly, a laser 1 emitting a beam 2 towards a mirror 3 which is shaped like a cylinder, the base of which is a regular polygon, and which therefore comprises a number of reflecting facets. The mirror 3 rotates on its longitudinal axis 4 under the effect of a motor 5 at high rotational speed.

The beam 2 is therefore reflected on the facets of the mirror 3 towards a direction that can vary according to the inclination of these facets 6. Since the mirror 3 has a regular shape, once the beam 2 is reflected, it does a periodic scan along a direction which is herein called the latitude and which is generally marked 1. The maximum span is marked Dl.

The directional scanning of the object to be located, in a direction which is perpendicular to the latitude 1 and which is therefore called the longitude L, is done by a rotation of the shaft of the mirror 3. A mounting 7 is provided for this purpose. The two arms 8 of this mounting each have a pivot 9 in which the shaft 4 rotates while its axis of revolution 10 is moved by an oscillating motion by means of a servo-motor. The axis 10 is substantially colinear with the axis of the beam 2 coming from the laser 1.

This device enables the beam, after reflection, to scan a longitudinal angle DL. The longitudinal scanning frequency is far smaller than the latitudinal scanning frequency. It may be equal to 1 Hz for example, which is to be compared with a latitudinal scanning frequency of 1600 Hz which can be obtained by a mirror 3 comprising sixteen facets 6 and a motor 5 used to communicate to the mirror 3 a rotation of 600 rpm, for example, by means of a belt and pulley transmission system 12. The motor 5 is fixed to the mounting 7 by means of a support 13 and, therefore, follows the movements of this mounting 7 at the same time as the shaft 4.

The beam thus reflected by the mirror 3 streaks through a space in which there is an object 20 to be located. This object may plausibly be a robotic arm which ends in a tool. The position of the object 20 is identified by means of a localized reference in the form of a sensor 21, which is sensitive to light radiation and which the deflected light beam 22 reaches when it takes the direction shown in FIG. 1 corresponding to a latitude $L_0$ and to a longitude $L_O$. According to a possible embodiment of the invention, the sensor 21 can be of a photovoltaic type with a wide visual angle. The sensor then transmits a pulse through a line 23 towards a measuring chain 24 which especially comprises a time measuring means.

What has to be done now is to relate this pulse, which is precisely located in time, to the latitude and longitude $1_O$ and $L_O$. It might be thought that this could be achieved through angular position encoders located on the motor 5 (or the mirror 3) and the servo-motor 11, the data from which would be transmitted at every instant to the measuring chain 24. An embodiment of this type cannot, however, give results with adequate precision because of difficulties in accurately setting and synchronizing encoders of this type, and above all, because of the speed with which the latitudinal scanning is done.

Hence, a completely different system is used. A screen 30 is arranged in the path of the light beam reflected between the mirror 3 and the object 20. This screen is fixed with respect to the laser 1 and the servo-motor 11, and is fixed to the same support 31.

The screen comprises a reflecting and/or scattering frame made of passivated stainless steel, for example, between the farthest borders of which are stretched steel cords 38. This screen, therefore, does not prevent the reflected light beam from streaking through the space in which the object 20 is located.

The reflecting and/or scattering frame 32 consists of four parts: two strips 33 and 34 reached by the light beam when it is deflected respectively along a maximum longitude $L_M$ and a minimum longitude $L_m$, and two strips, 35 and 36, reached by the light beam when it is deflected respectively along a maximum latitude $L_M$ and a minimum latitude $L_m$. The longitudinal strips, 33 and 34, both join the two latitude strips, 35 and 36.

When the light beam reaches one of these strips, for example, the reference point C, it is scattered to a second or encoding sensor 25 fixed with respect to the support 31 and capable of transmitting an item of excitation information to the measuring chain 24 through a line 26. The frame 32 can scatter the light beam directly towards the encoding sensor 25 or, again, it can reflect it through the mirror 3. The entire screen 30 is cylindrical, with an axis that is colinear with that of the axis 10 so as to simplify the interpolating computation.

Similarly, the cords 38 scatter the light beam that strikes them towards the encoding sensor 25.

Figure 2:
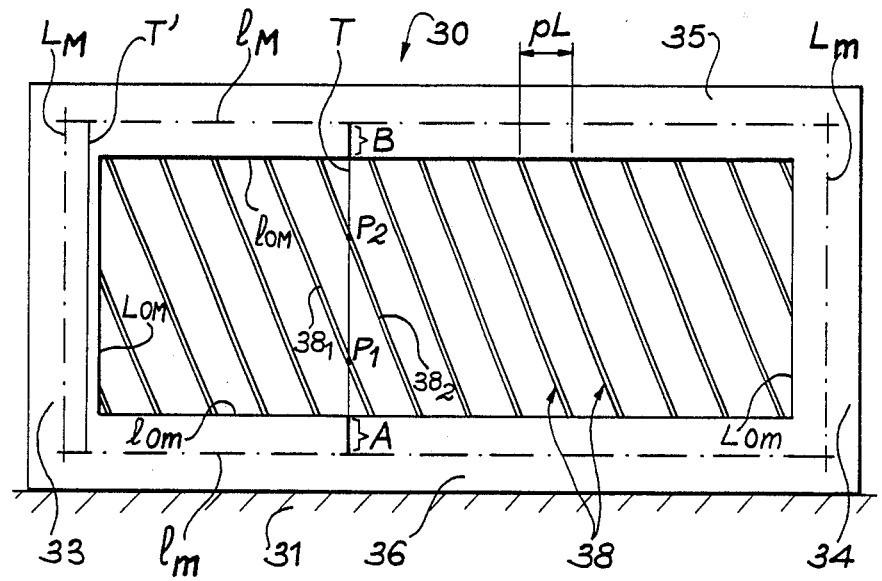
FIG. 2 shows a view of a locating screen according to the invention.

The cords 38 are oblique, and most of them join the latitude strips 35 and 36. For a more precise description, however, reference can now be made to FIG. 2.

The screen 30 is shown along a plane projection such that the points of constant latitude and longitude appear respectively in the form of horizontal and vertical lines. It is seen that, in this depiction, the cords 38 appear to be rectilinear, parallel, oblique and evenly distributed. The coordinates of their points, expressed in latitude and longitude, are governed by a linear equation. The longitudinal span between two consecutive cords 38 is marked pL.

During a latitudinal scan, the light beam travels along a path T, on the screen 30, which is a straight line that is almost vertical because of the far slower longitudinal scan. The path T comprises, first of all, a segment A corresponding to the scattering of the light beam on the lower latitude strip 36, and then an intermediate part where the beam is scattered only at two points, $p_1$ and $p_2$, where it is scattered by two neighbouring cords 381 and 382 and, finally, a segment B corresponding to a scattering of the light beam by the higher latitude strip 35.

Since the cords 38 are evenly distributed most of the paths T comply with this description. The only exception concerns the paths T' obtained by extreme longitudinal deflections, for which the light beam is always scattered by one of the longitudinal strips 33 and 34.

The segments A and B have points for which the latitudinal coordinates are respectively included between $L_m$ and $L_{Om}$ and between $L_{OM}$ and $L_M$ regardless of the longitudinal position of these segments. Furthermore, the longitudinal strips 33 and 34 extend in the direction of the intermediate longitudes up to the longitudes $L_{OM}$ and $L_{Om}$ respectively. The space in which it is sought to locate the object 20 through the sensor 21 is therefore bounded by the latitudes $L_{OM}$ and $L_{Om}$ and the longitudes $L_{OM}$ and $L_{Om}$.

Figure 3:
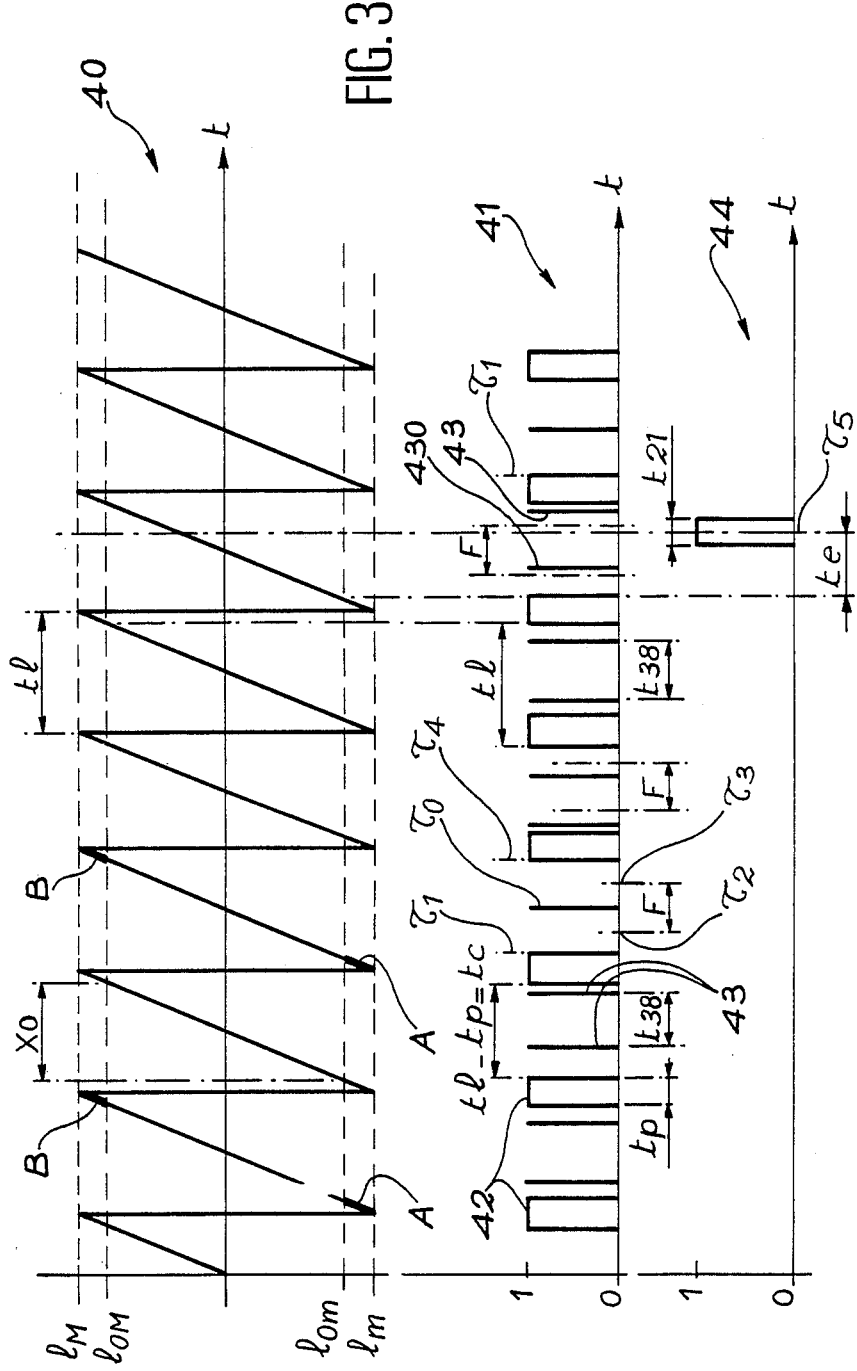
FIG. 3 shows the latitudinal scanning as a function of time and of the data collected.

The process of latitudinal scanning is shown in figure 3. A timing diagram 40 indicates the latitude of the light beam reflected by the mirror 3. A diagram 41 indicates the distribution of the excited states of the encoding sensor 25 as a function of time when the path of the light beam does not pass through one of the longitudinal strips 33 and 34. It will be observed that the rotation of the facets 6 communicates a constant rotational speed to the light beam between $l_m$ and $l_M$ followed by a sudden fall back to $l_m$ when the beam is reflected by a neighboring facet. The result of this is that the path of a segment B along a trajectory T is immediately followed by the path of the segment A on the following path. For the encoding sensor 25, this results in temporal stages 42, the duration of which is marked tp, and which are evenly distributed since the latitudinal scanning speed is constant and has a period tl.

During the time intervals $tc=(tl-tp)$ between two stages 42, the encoding sensor 25 is again excited, according to very short pulses 43, because of the scattering of the light beam due to the cords 38. In a time interval tc, the interval t38 between two stages or pulses 43 is constant for the cords 38 are evenly distributed. In this special embodiment of the invention where the inclination of each cord 38 between the farthest latitude strips 35 and 36 is defined by its projection on either strip which is equal to twice the longitudinal distance pL between chords 38 (see FIG. 2) there are generally two pulses 43 in one interval tc, except for a special case where only one pulse is found in the middle of this interval tc.

The steps 42 and the pulses 43 give a locating code.

When the sensor 21 is reached by the light beam, it emits a pulse with a duration $t_{21}$ (shown in the graph 44) smaller than the duration tc. The measuring chain 24 then measures the duration te ranging between the instant $\tau_1$ at the end of the immediately preceding stage 42, and the instant $\tau_5$ which is the mean instant of the pulse given by the sensor 21. The latitude $l_0$ of the sensor 21 can be obtained by the formula:

$$l_O = l_{Om} + \left(\frac{te}{tc}\right)(l_{OM} - l_{Om}).$$

Figure 4:
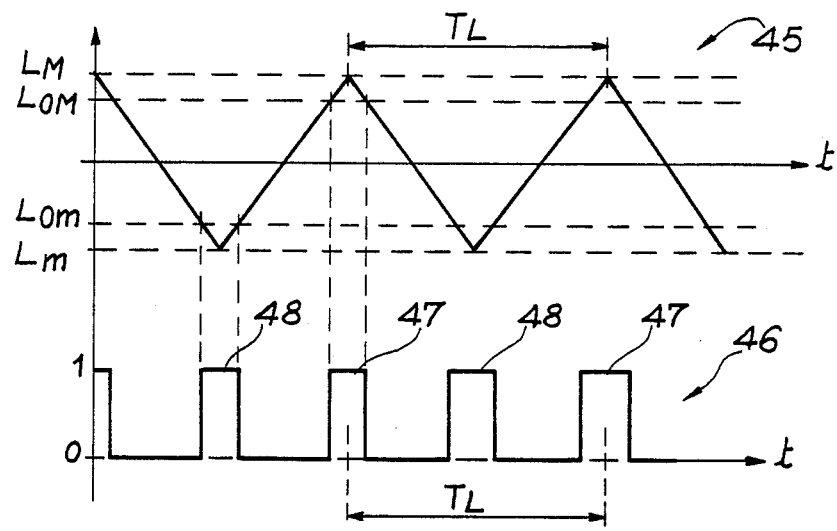
FIG. 4 shows the longitudinal scanning as a function of time.

Longitudinal position-finding is done somewhat differently. We shall now refer simultaneously to FIGS. 3 and 4. It can be seen, in FIG. 4, that the encoding sensor 25 is illuminated during long duration stages 47 and 48 which follow one another alternately in time. The stages 47 correspond to instants where the beam is at a longitude greater than $L_{OM}$ and the stages 48 correspond to other instants where the beam is at a longitude smaller than $L_{Om}$. The longitudinal scanning period is marked TL.

At the end of a step 47, it is therefore known that the light beam is deflected to the longitude $L_{OM}$ and that this deflection decreases with time. At the end of a stage 48, it is also known that the light beam is deflected to a longitude $L_{Om}$ and that this longitude increases with time. Between these two extremes, longitudinal position-finding is done by means of the cords 38 as can be seen in the diagram 41 in FIG. 3. Between the instant $\tau_1$ at the end of a stage 42 and the instant $\tau_4$ at the start of the following stage 42, an encoding window F is defined, the duration of which is equal to half the interval tc and which is placed symmetrically with reference to the instants $\tau_1$ and $\tau_4$. If the temporal boundaries of the encoding window F are marked $\tau_2$ and $\tau_3$, we can write:

$$\tau_2 = \tau_1 + \frac{(\tau_4 - \tau_1)}{4} \quad \tau_3 = \tau_1 + \frac{3}{4}(\tau_4 - \tau_1)$$

A pulse 43 always occurs at an instant $\tau_0$ greater than $\tau_2$ and smaller than or equal to $\tau_3$. The pulse thus defined is single.

The longitude of the beam can then be determined, barring an additive constant, by the formula:

$$L = k \cdot pL + pL \cdot \left(\frac{\tau_0 - \tau_2}{\tau_3 - \tau_2}\right)$$

k is a positive whole number due to the fact that the cords 38 are evenly distributed. The measuring chain 24 can increment this number by means of a counter as soon as, for example, the time interval $(\tau_0 - \tau_2)$ decreases.

The longitude $L_O$ of the sensor 21 corresponds to the longitude thus computed, for which a pulse is present on the line 23. The pulse for which $L_O$ must then be calculated, by applying the above formula, is marked 430 in FIG. 3.

It is thus observed that the screen 30 enables reliable positioning of the sensor 21 in space. It is enough to build the border 32 and assemble the cords 38 with adequate precision. As for making the diagrams, such as 41 and 44 temporally discrete, this can be done with adequate precision in the range of latitudinal scanning frequencies since there are measuring chains 24 available enabling a counting frequency of 5 MHz.

Other alternative embodiments of the invention can be proposed. The sensor 21 could also be a purely optical sensor which would reflect or scatter the light of the light beam towards a sensor similar to the one marked 25 in FIG. 1. The rotating mirror 3 could be replaced by an oscillating mirror at the cost, however, of a far smaller latitudinal scanning frequency. Finally, the number of cords 38 crossed during a latitudinal scan may be other than two because there are other possible methods of counting during a scan between two stages 42.

A major application of the invention, but one that is evidently not a unique application, is in robotics.

Finally, if it is desired to identify the position of the sensor 21 and not only its direction, it is possible to have two systems according to the invention, and to combine their data by means of a computing system.

In this embodiment, the screen 30 is placed between the rotating mirror 3 and the sensor 21, and intercepts the light emitted towards the sensor. Without going beyond the scope of the invention, it would be possible to use a second light beam specially for the screen 30 according to methods similar to those of the British patent No. 2 085 580. This second beam would be produced by another laser. The beams would differ in their wavelength or their direction of polarization, and would have a common portion of a path around the rotating mirror 3: there would then be, for example, two dichroic mirrors upline and downline of the rotating mirror 3 to combine the beams and then to separate them. The screen 30 would then be at a distance from the beam emitted towards the sensor 21. However, this approach is not an advantageous one because the use of the screen with thin cords, unlike the graduations of this British patent, enables the use of a single beam to identify the position of the object and to measure the deflection with a simpler device and with precise results.

What is claimed is:

1. A system for locating an object, comprising a light emitting means emitting a light beam, a device that communicates, to the emitted light beam, a deflection that is variable as a function of time, making it perform scans along two directions, i.e. latitude and longitude, of a space in which the object is placed, a device enabling the measurement of this deflection, a first sensor which is fixed to the object and is sensitive to a first portion of the deflected light beam as well as a means to determine the direction of a second portion of the deflected light beam at the instant when the first portion of the deflected light beam sensitizes the first sensor.

2. A system for locating an object according to claim 1 wherein the device for communicating the deflection of the emitted light beam includes a rotational reflecting mirror.

3. A system for locating an object according to claim 2 wherein the mirror has the shape of a cylinder with a regular polygon as its base, with a lateral surface consisting of reflecting facets and rotating on a longitudinal axis of symmetry.

4. A system for locating an object according to claim 3 comprising a device that makes the cylinder oscillate on a second axis which is substantially colinear with the axis of the emitted light beam between the light emitting means and the mirror.

5. A system for locating an object according to claim 1 wherein the device used to measure the reflection comprises a screen disposed after the device communicating the deflection, one part of the surface of which sends back by reflection and/or scattering, the second portion of the deflected light beam to a second sensor sensitive to the reflected and/or scattered light beams in order to determine the direction of the second portion of the deflected light beam according to the latitudinal and longitudinal deflections.

6. A system for locating an object according to claim 5 wherein the second portion of the deflected light beam simultaneously performs periodic longitudinal and latitudinal scans, the latitudinal scan having a frequency that is far higher than that of the longitudinal scan and wherein the reflecting and/or scattering surface of the screen comprises a first border reached by the second portion of the deflected light beam at extreme latitudinal deflections.

7. A system for locating an object according to claim 6 wherein the reflecting and/or scattering surface of the screen further comprises cords that are evenly distributed so that the second portion of the reflected light beam reaches at least one of said cords during a latitudinal scan, and the coordinates of points of impingement thereon, expressed in latitude and longitude, are governed by a linear equation.

8. A system for locating an object according to claim 7 wherein the cords reached by the second portion of the deflected light beam during a latitudinal scan are two in number.

9. A system for locating an object according to claim 6 wherein the reflecting and/or scattering surface of the screen further comprises a second border reached by the second portion of the deflected light beam at extreme longitudinal deflections.

* * * * *